(No Model.)
J. T. RICHARDS.
DUST GUARD FOR HUBS.
No. 478,466. Patented July 5, 1892.
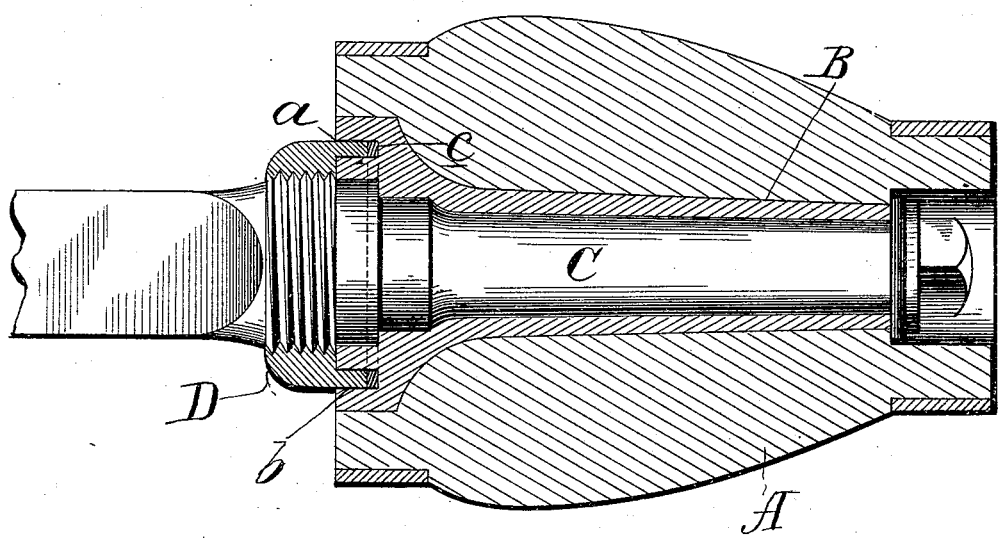
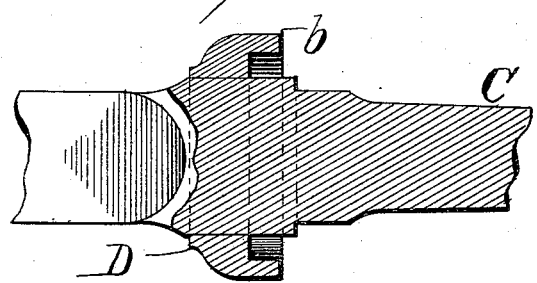
Witnesses
G. Nottingham
H. B. Ames
Inventor
John T. Richards
By H. A. Symons.
Attorney

UNITED STATES PATENT OFFICE.

JOHN TUDOR RICHARDS, OF GARDINER, MAINE.

DUST-GUARD FOR HUBS.

SPECIFICATION forming part of Letters Patent No. 478,466, dated July 5, 1892.

Application filed February 24, 1892. Serial No. 422,663. (No model.)

*To all whom it may concern:*

Be it known that I, JOHN TUDOR RICHARDS, a resident of Gardiner, in the county of Kennebec and State of Maine, have invented certain new and useful Improvements in Dust-Guards for Hubs; and I do hereby declare the following to be a full, clear, and exact description of the invention, such as will enable others skilled in the art to which it appertains to make and use the same.

My invention relates to an improvement in hubs, and more particularly to an improved dust-guard to be used in connection with an ordinary wooden hub, the object of the invention being to provide a simple and efficient dust-guard which may be secured in place with the ordinary carriage-maker's tools and which may be used in connection with a wooden hub of any preferred construction.

A further object is to construct the device in such manner that dust and dirt will be effectually excluded and oil will be prevented from escape.

With these objects in view the invention consists in certain novel features of construction and combinations and arrangements of parts, as hereinafter set forth, and pointed out in the claims.

Figure 1 is a longitudinal sectional view of my improvements. Fig. 2 is a view of a modification.

A represents the hub, B the axle-box, and C the axle. The axle-box B is preferably enlarged somewhat at its inner end and provided in its inner extremity with an annular groove $a$. A dust guard or collar D is located on the axle C and is provided with an annular flange $b$, adapted to enter the annular groove $a$ in the axle-box B. If desired, a washer $c$ may be placed in the end of the groove $a$. The interior of the collar or guard D may be made with screw-threads adapted to mesh with screw-threads on the axle; or, if desired, said collar or guard may be shrunk onto the axle, as shown in Fig. 2.

With the device constructed and arranged as above set forth a perfect protection will be afforded from water, sand, and dirt. The device will prevent the escape of oil and can be applied to any hub by any ordinary carriage-maker with his usual tools and with very little trouble and expenditure of time.

The device is very simple, cheap, and effective in the performance of its functions.

Having fully described my invention, what I claim as new, and desire to secure by Letters Patent, is—

1. The combination, with an axle, of a dust-guard located on the axle, said dust-guard provided with an annular outwardly-projecting flange, and an axle-box having an enlarged inner end, in which an annular groove is formed adapted to receive the annular flange on the dust-guard, said groove of greater depth than the length of the flange, whereby a recess is formed for a washer, and the portion of the dust-guard adjacent to the flange forming a shoulder or abutment for the inner end of the axle-box, substantially as set forth.

2. The combination, with an axle having a screw-thread thereon and a dust-guard screwed on these threads of the axle, said guard provided with an annular flange at its outer edge and a shoulder within this flange, of an axle-box provided with an annular groove in its inner end, adapted to receive the flange, this inner end constructed to abut against the shoulder within the annular flange, substantially as set forth.

In testimony whereof I have signed this specification in the presence of two subscribing witnesses.

JOHN TUDOR RICHARDS.

Witnesses:
AMASA E. HARMON,
GEO. W. HESELTON.